United States Patent
Choi

(10) Patent No.: US 6,923,020 B2
(45) Date of Patent: Aug. 2, 2005

(54) EVAPORATOR CORE WITH A SEPARABLE TUBE AND A FIN FOR A VEHICLE

(75) Inventor: Jae Sik Choi, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/822,175

(22) Filed: Apr. 9, 2004

(65) Prior Publication Data

US 2005/0061026 A1 Mar. 24, 2005

(30) Foreign Application Priority Data

Sep. 23, 2003 (KR) .................................. 10-2003-0065756

(51) Int. Cl.[7] .............................................. F25B 39/02
(52) U.S. Cl. ............................ 62/515; 62/517; 165/78; 165/164
(58) Field of Search .......................... 62/515, 516, 517; 165/76, 78, 80.3, 164

(56) References Cited

U.S. PATENT DOCUMENTS

| | | | | |
|---|---|---|---|---|
| 4,637,132 A | * | 1/1987 | Iwase et al. ................... 29/726 |
| 5,542,471 A | * | 8/1996 | Dickinson ................... 165/170 |
| 5,894,649 A | * | 4/1999 | Lambert et al. ....... 29/890.052 |
| 5,947,192 A | * | 9/1999 | Kuo ........................... 165/80.3 |
| 6,189,601 B1 | * | 2/2001 | Goodman et al. ......... 165/80.3 |
| 6,199,625 B1 | * | 3/2001 | Guerrero ................... 165/80.3 |
| 6,209,623 B1 | * | 4/2001 | Tantoush ................... 165/80.3 |
| 6,234,239 B1 | * | 5/2001 | Azar .......................... 165/80.3 |
| 6,328,100 B1 | * | 12/2001 | Haussmann ................. 165/176 |
| 6,408,941 B1 | * | 6/2002 | Zuo ........................... 165/165 |
| 6,554,060 B2 | * | 4/2003 | Noda et al. ................. 165/80.3 |
| 6,595,275 B1 | * | 7/2003 | Wang et al. ................ 165/185 |
| 6,607,028 B1 | * | 8/2003 | Wang et al. ................ 165/185 |

FOREIGN PATENT DOCUMENTS

| | | | | |
|---|---|---|---|---|
| JP | 362050025 A | * | 3/1987 |
| JP | 01165198 A | * | 6/1989 |
| JP | 10339600 A | * | 12/1998 |
| JP | 2000-043551 | | 2/2000 |
| JP | 2003-136949 | | 5/2003 |
| JP | 2003-148834 | | 5/2003 |
| KR | 10-2001-0085507 | | 7/2001 |

* cited by examiner

*Primary Examiner*—William E. Tapolcai
*Assistant Examiner*—Mohammad M. Ali
(74) *Attorney, Agent, or Firm*—Morgan Lewis & Bockius LLP

(57) ABSTRACT

An evaporator core includes a separable housing and a fin assembly. The housing is installed in such a manner that both sides of the housing are open, and a guide rail is installed on an upper surface and a bottom surface of the interior of the housing. A tank is integrally attached to an upper side of the housing and communicates with the housing. A fin assembly is installed in such a manner that the fin assembly slides along the guide rail of the housing for thereby being disengaged or engaged. A rain groove is formed in an upper and lower surface of the fin assembly.

5 Claims, 3 Drawing Sheets

EVAPORATOR CORE WITH A SEPARABLE TUBE AND A FIN FOR A VEHICLE

CROSS-REFERENCE TO RELATED APPLICATIONS

This application claims priority of Korean Application No. 10-2003-0065756, filed on Sep. 23, 2003, the disclosure of which is incorporated fully herein by reference.

FIELD OF THE INVENTION

The present invention relates to an evaporator core with a separable tube and a fin for a vehicle, and, in particular, to such an evaporator core that is capable of enhancing drain operation of condensation water and maintaining a clean state of an air conditioner.

BACKGROUND OF THE INVENTION

A vehicle cooling apparatus generally comprises an evaporator, a compressor, a condenser, and an expansion valve. A coolant with a moderate temperature from a condenser is changed to a coolant of a low temperature and low pressure vapor as it passes through an expansion valve. The coolant is then vaporized into a gas at a low temperature and low pressure by the air generated by a blower as it passes through an evaporator. Finally, the coolant is vaporized as it passes through the tubes of the evaporator and absorbs the heat of the air passing through the surface of the fins of the evaporator, so that the cooled air is driven into the interior of the vehicle for thereby achieving a cooling process. The temperature of the air is decreased due to a heat exchange between the coolant flowing through the tubes of the evaporator and the air flowing through the outer surface of the evaporator. A dew condensation phenomenon can occur on the surface of the evaporator with a lowered temperature resulting from a difference in temperature between the surrounding areas, and condensation water is produced accordingly. The condensation water is discharged to the outside of a vehicle through a drain hole formed in a lower casing.

In the conventional art, the tube and fin of an evaporator are provided in an integrated state. The tubes are arranged in a horizontal structure. A coolant storing tank is provided in one side of the same. When an air conditioner is operated in a vehicle, there occurs a heat exchange between a coolant and a hot air, which results in condensation of water in an evaporator core. The condensation water is discharged to the outside of the vehicle through a drain hose. However, not the entire condensation water is discharged but a part of the condensation water still remains in a surrounding portion of a radiating fin of the evaporator core. In particular, since the conventional evaporator is arranged in a horizontal structure and is formed in an integral structure with a tube and a fin, drainage of condensation water is not well provided for. Therefore, the remaining condensation water is mixed with foreign substance introduced from the outside of the vehicle, so that mold is grown for thereby generating bad odors. As an example for enhancing the performance of drain, according to the Japanese patent laid-open No. 2000-43551, an evaporator core is arranged at a certain slanted angle with respect to a dash panel. According to the Japanese patent laid-open No. 2003-136949, a drain part of a slanted part installed in a direction of a front side of a vehicle is provided in a lower portion of an evaporator.

However, the entire structure of a crash pad provided in a front side of a driver's seat and passenger's seat (next to the driver's seat) should be disengaged when an evaporator is disengaged for maintenance because the tubes and the fins are integrally provided.

In order to overcome the above problems, Korean patent application No. 10-2001-0009170 discloses a detachable structure provided without changing a conventional structure of tubes and fins. However, the tubes and fins are not actually separated but there is provided a module type of tubes and fins. In addition, provision for keeping an air conditioner clean is not made possible.

SUMMARY OF THE INVENTION

Embodiments of the present invention provide an evaporator core comprising a fin assembly having grooves, a housing of plate type, a guide rail installed to the housing, and a tank fluidically communicating with the housing. The tank is mounted on the housing and the fin assembly is slidably inserted into or ejected from the housing in a vertical position with assistance of the guide rails installed at the lower end and at the upper end of the housing so that condensation water easily flows down for thereby enhancing a drain operation.

In a preferred embodiment of the present invention, an evaporator core further comprises a plurality of airflow holes formed on the surface of the housing.

In a further preferred embodiment of the present invention, an evaporator core further comprises a fixing lever rotatably installed on a front end of a tank in order to prevent the fin assembly from being unintentionally separated from the housing. In addition, a handle is integrally formed on one surface of the fin assembly for easier handling of the fins.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Hereinafter, such embodiments of the present invention are described in detail with reference to the accompanying drawings.

Figure 1:
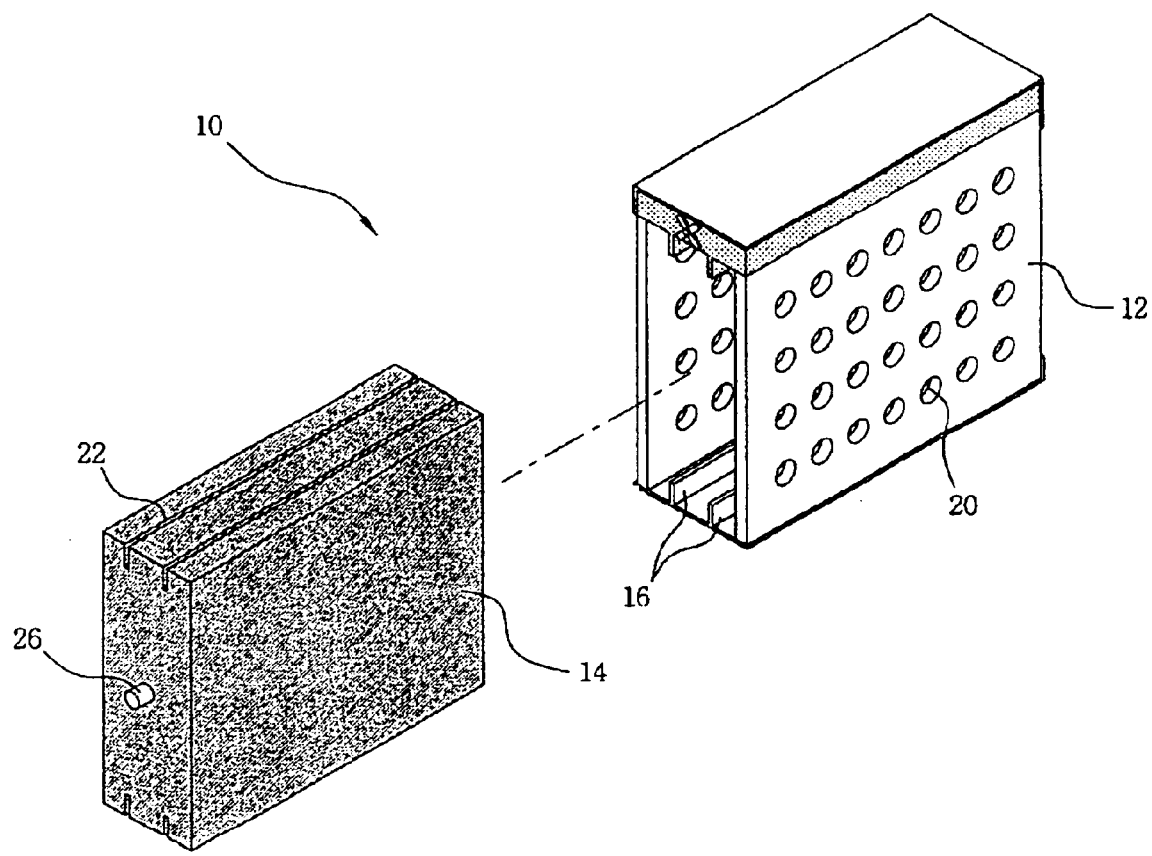
FIG. 1 is a perspective view illustrating a separated housing and a fin assembly of an evaporator for a vehicle according to an embodiment of the present invention.
Figure 2:
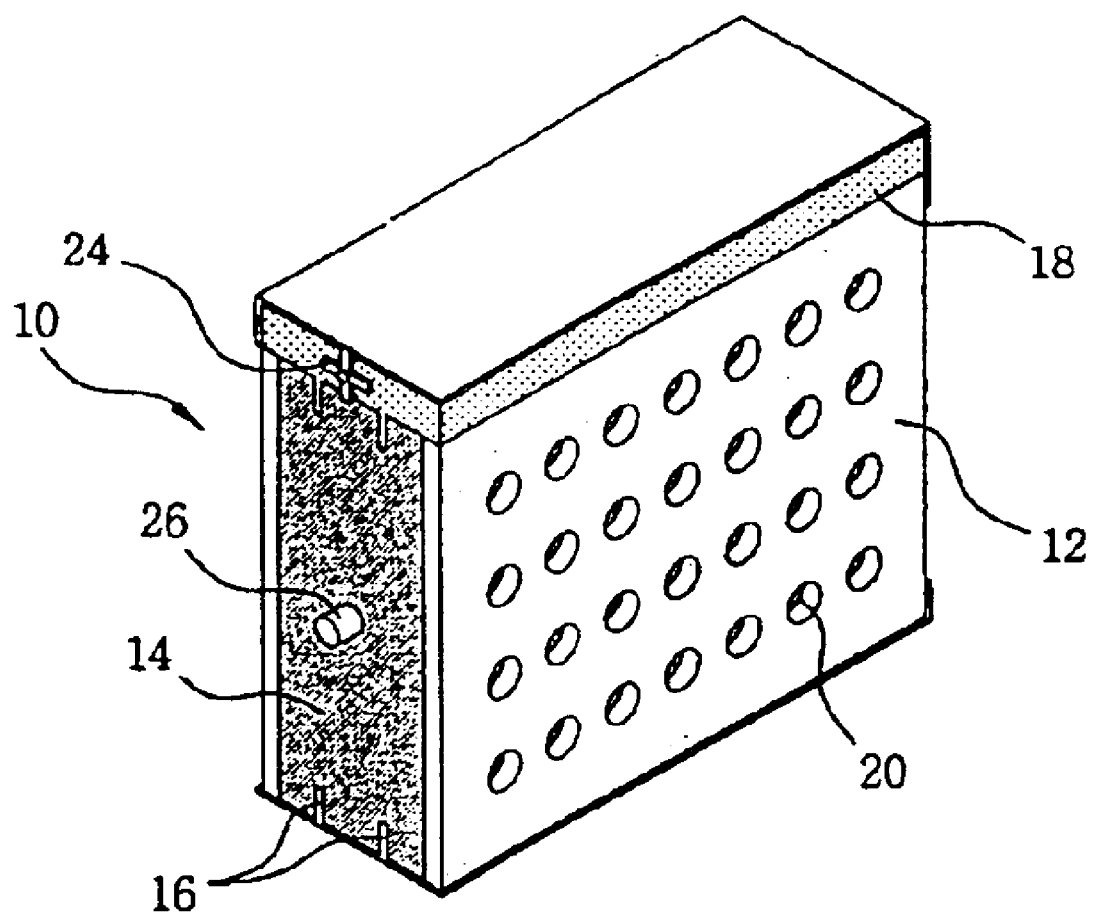
FIG. 2 is a perspective view of an evaporator for a vehicle according to an embodiment of the present invention.
Figure 3:
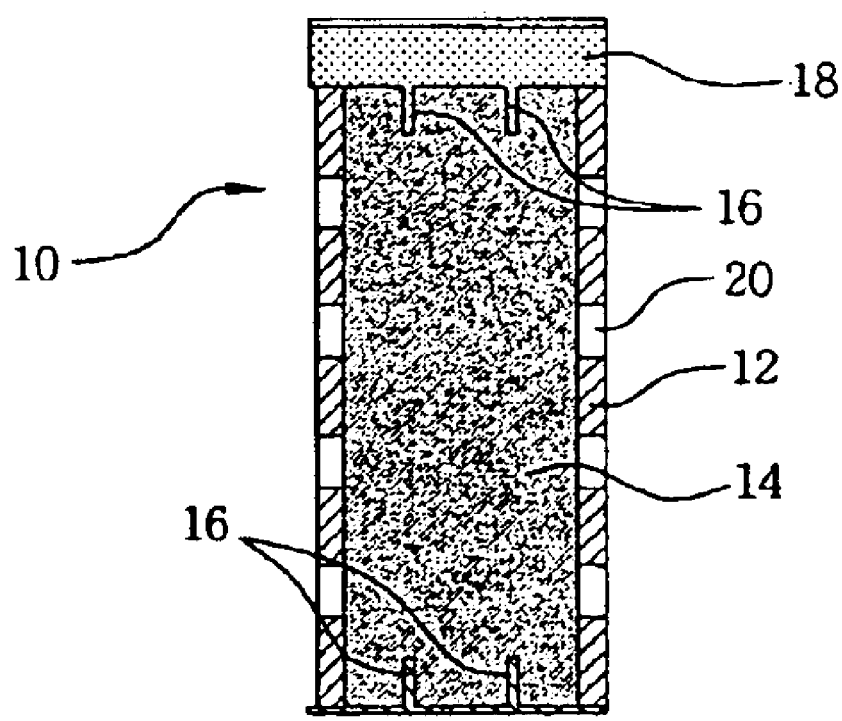
FIG. 3 is a cross sectional view of an evaporator for a vehicle according to an embodiment of the present invention.

As shown in FIGS. 1–3, an evaporator 10 according to an embodiment of the invention includes a generally rectangular structure as a housing 12 and a fin assembly or bank of fins 14 that is received therein. The entire structure of the housing 12 may be formed as a hollow rectangular pipe. A guide rail 16 is installed at a bottom surface of the housing 12. Mounted at an uppermost portion of the housing 12 is a tank 18, fluidically communicating with the housing 12, wherein coolant flows into the tank 18.

The housing 12 is provided with a plurality of airflow holes 20 for heat exchange purposes. In particular, in the present invention, with the housing 12 being installed in a vertical direction as compared to the conventional housing installed in a horizontal direction, condensation water easily flows down for enhancing drainage.

A fixing lever 24 is rotatably installed at a front end of the tank 18 provided on an upper side of the housing 12 in order to prevent the fin 14 from being unintentionally separated from housing 12. A rail groove 22, into which the guide rail 16 is inserted, is respectively provided on an upper and lower surface of the fin assembly 14. A handle 26 is integrally attached to one surface of the fin assembly 14 for easier handling of the fin assembly 14. In fabricating the fin assembly 14 and the housing 12, the fin assembly 14 is pushed into a gap between the housing 12 while the guide rails 16 are engaged with the rail grooves 26 formed on the fin assembly 14. Thereafter, the fixing lever 24 moves downwardly in order to limit the movement of the fin assembly 14 in the housing 12.

When separating the housing 12 and the fin assembly 14 of the evaporator 10, the fixing lever 24 is lifted up, and the fin assembly 14 is pulled out using the handle 28, so that disengagement between the housing 12 and the fin assembly 14 of the evaporator is easily performed according to the present invention.

The fin assembly 14 of the evaporator 10 is slid along the guide rail 16, so that the fins may be periodically separated from the housing 12. Therefore, it is possible to easily get rid of mold or other contaminants from the interior of the housing 12. In addition, the coolant flows easily from the tank 18 to the housing 12, and air flows easily into the fin assembly 14 through the airflow holes 20 formed in the housing 12, so that heat exchange is well achieved. It is then possible to enhance cooling performance of the air conditioner.

In the present invention, it is possible to easily separate the fin assembly from the housing without disassembling the crash pad belonging to the front sides of the driver's seat and the assistant's seat for thereby implementing an easier workability.

What is claimed is:

1. An evaporator core of a vehicle, comprising:

a fin assembly having grooves at an upper surface and a bottom surface thereof;

a housing configured to receive the fin assembly therein;

a guide rail installed at a lower side and at an upper side of said housing; and a tank fluidically communicating with said housing, the tank being mounted on said housing, wherein the fin assembly is slidably inserted into or ejected from the housing by sliding along the guide rails installed at the lower side and at the upper side of the housing.

2. The evaporator core according to claim 1, wherein a plurality of air flow holes are formed in the housing.

3. The evaporator core according to claim 1, wherein a fixing lever is rotatably installed at a front end of the tank in order to prevent the fin assembly from being unintentionally separated from the housing.

4. The evaporator core according to claim 1, wherein the fin assembly is provided with a handle integrally formed at a lateral surface thereof in order to facilitate manipulation.

5. The evaporator core according to claim 1, wherein said housing is formed from a rectangular pipe.

* * * * *